United States Patent
Hogan et al.

(10) Patent No.: US 11,175,944 B2
(45) Date of Patent: Nov. 16, 2021

(54) OPTIMIZING CLUSTER-WIDE OPERATIONS IN A HYPER-CONVERGED INFRASTRUCTURE (HCI) DEPLOYMENT

(71) Applicant: VMware, Inc., Palo Alto, CA (US)

(72) Inventors: Cormac Hogan, Cork (IE); Frank Denneman, Purmerend (NL); Duncan Epping, Helmond (NL)

(73) Assignee: VMWARE, INC., Palo Alto, CA (US)

( * ) Notice: Subject to any disclaimer, the term of this patent is extended or adjusted under 35 U.S.C. 154(b) by 177 days.

(21) Appl. No.: 16/733,496

(22) Filed: Jan. 3, 2020

(65) Prior Publication Data

US 2021/0208915 A1 Jul. 8, 2021

(51) Int. Cl.
*G06F 9/455* (2018.01)
*G06F 9/48* (2006.01)

(52) U.S. Cl.
CPC ........ *G06F 9/45558* (2013.01); *G06F 9/4856* (2013.01); *G06F 2009/4557* (2013.01); *G06F 2009/45595* (2013.01)

(58) Field of Classification Search
CPC .................................................. G06F 9/45558
USPC ................................................................ 718/1
See application file for complete search history.

(56) References Cited

U.S. PATENT DOCUMENTS

| | | | | |
|---|---|---|---|---|
| 8,874,744 B2 * | 10/2014 | Zhang | ................... | H04L 47/125 709/226 |
| 10,083,057 B1 * | 9/2018 | Currie | ................. | G06F 9/45558 |
| 10,691,564 B2 * | 6/2020 | Tsuchiya | ................ | G06F 3/0617 |
| 2010/0333111 A1 * | 12/2010 | Kothamasu | ............. | H04L 51/14 719/313 |
| 2011/0191477 A1 * | 8/2011 | Zhang | .................. | H04L 43/0876 709/226 |
| 2012/0166644 A1 * | 6/2012 | Liu | ........................ | G06F 9/4856 709/226 |
| 2013/0086272 A1 * | 4/2013 | Chen | ..................... | G06F 9/4856 709/226 |
| 2013/0227551 A1 * | 8/2013 | Tsirkin | ................ | G06F 9/45558 718/1 |
| 2014/0007099 A1 * | 1/2014 | Emaru | .................... | G06F 3/067 718/1 |
| 2014/0082679 A1 * | 3/2014 | Chan | ................... | H04N 21/2181 725/92 |
| 2015/0039764 A1 * | 2/2015 | Beloglazov | ............. | H04L 47/70 709/226 |
| 2015/0046586 A1 * | 2/2015 | Zhang | ................... | G06F 15/173 709/224 |
| 2015/0169349 A1 * | 6/2015 | Joffe | .................... | G06F 9/45558 718/1 |

(Continued)

*Primary Examiner* — Mehran Kamran (57) ABSTRACT

Techniques for optimizing cluster-wide operations in a hyper-converged infrastructure (HCI) deployment are provided. In one set of embodiments, a computer system can receive a request to initiate a cluster-wide operation on a cluster of the HCI deployment, where the cluster includes a plurality of host systems, and where the cluster-wide operation involves a host-by-host evacuation of virtual machines (VMs) and storage components from the plurality of host systems. The computer system can further generate a set of recommendations for executing the host-by-host evacuation in a manner that minimizes the total amount of time needed to complete the cluster-wide operation. The computer system can then execute the host-by-host evacuation in accordance with the set of recommendations.

18 Claims, 9 Drawing Sheets

(56) References Cited

U.S. PATENT DOCUMENTS

| | | | |
|---|---|---|---|
| 2015/0261574 A1* | 9/2015 | Greden | G06F 9/45558 718/1 |
| 2015/0372867 A1* | 12/2015 | Amann | H04L 67/1097 709/221 |
| 2016/0170462 A1* | 6/2016 | Shanmuganathan | G06F 9/45558 713/340 |
| 2019/0095232 A1* | 3/2019 | Okuno | G06F 9/45558 |
| 2019/0215175 A1* | 7/2019 | Mathew | G06F 9/45558 |
| 2020/0004570 A1* | 1/2020 | Glade | G06F 9/45558 |
| 2020/0117494 A1* | 4/2020 | Cortez | G06F 9/5088 |
| 2020/0174815 A1* | 6/2020 | Ramesh | G06F 9/45558 |
| 2020/0319874 A1* | 10/2020 | Hoprich | G06F 8/65 |
| 2020/0394071 A1* | 12/2020 | Panse | G06F 9/5011 |
| 2021/0034350 A1* | 2/2021 | Chen | G06N 20/00 |
| 2021/0173687 A1* | 6/2021 | Bade | G06F 9/45558 |

\* cited by examiner

OPTIMIZING CLUSTER-WIDE OPERATIONS IN A HYPER-CONVERGED INFRASTRUCTURE (HCI) DEPLOYMENT

BACKGROUND

In a hyper-converged infrastructure (HCI) deployment comprising a cluster of host systems, persistent data associated with the cluster's virtual machines (VMs) is maintained in the form of storage objects and each storage object is composed of one or more storage components that are distributed across the local storage resources of the host systems. In such HCI deployments, administrators occasionally need to carry out cluster-wide operations, which are operations that involve performing one or more maintenance tasks on each host system in the deployment's cluster. Examples of these maintenance tasks include replacing hardware components, updating hypervisor software, and so on.

As part of carrying out a cluster-wide operation on a cluster of an HCI deployment, the host systems of the cluster are typically "evacuated" on a host-by-host basis, which means that the VMs and/or storage components residing on the host systems are moved, one host system at a time, to other host systems in the cluster. This enables each evacuated host system to be taken offline and acted upon (or in other words, "actioned") in accordance with the cluster-wide operation's associated maintenance task(s), while at the same time allowing the evacuated host system's VMs and storage components to remain operational/accessible.

However, in existing HCI platform implementations, the manner in which the host-by-host evacuation proceeds is largely arbitrary. As a result, when a given host system H1 is evacuated, its VMs and storage components may be moved to another host system H2 that has not yet been actioned per the cluster-wide operation. In this scenario, the VMs and storage components originating from host system H1 will have to be moved again from host system H2 to yet another host system when it is H2's turn to be actioned (and thus evacuated), thereby undesirably lengthening the total amount of time needed to complete the cluster-wide operation.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques for optimizing the execution of cluster-wide operations on a cluster of an HCI deployment. More particularly, these techniques involve automatically determining, by a cluster management server, (1) a recommended order in which to evacuate the cluster's host systems as part of a cluster-wide operation, and (2) for each host system, the recommended destination host system(s) to which the host system's VMs and/or storage components should be moved to, such that the total amount of time needed to complete the host-by-host evacuation process (and thus, the cluster-wide operation) is minimized. For example, with respect to (1), the cluster management server can employ a heuristic which ensures that host systems with smaller amounts of local storage capacity consumed by storage components are evacuated before host systems with greater amounts of local storage capacity consumed by storage components. And with respect to (2), the cluster management server can employ a heuristic which ensures that the VMs and/or storage components of each evacuated host system are moved to other host system(s) that have already been actioned per the cluster-wide operation, to the extent possible.

In one set of embodiments, upon determining (1) and (2), the cluster management server can automatically carry out the host-by-host evacuation process in accordance with its recommendations. In another set of embodiments, the cluster management server can present the recommended order of host evacuations to a cluster administrator (or some other user/agent), and the cluster administrator can manually select the order in which the cluster host systems will be evacuated. This latter set of embodiments is useful in scenarios where the cluster administrator is interested in weighing the recommendations of the cluster management server against other factors that may be pertinent to the cluster-wide operation (e.g., desire or need to action certain host systems first due to time constraints, cluster topology, etc.) and manually controlling how the cluster-wide operation will proceed based on that analysis.

2. Example HCI Deployment

Figure 1:
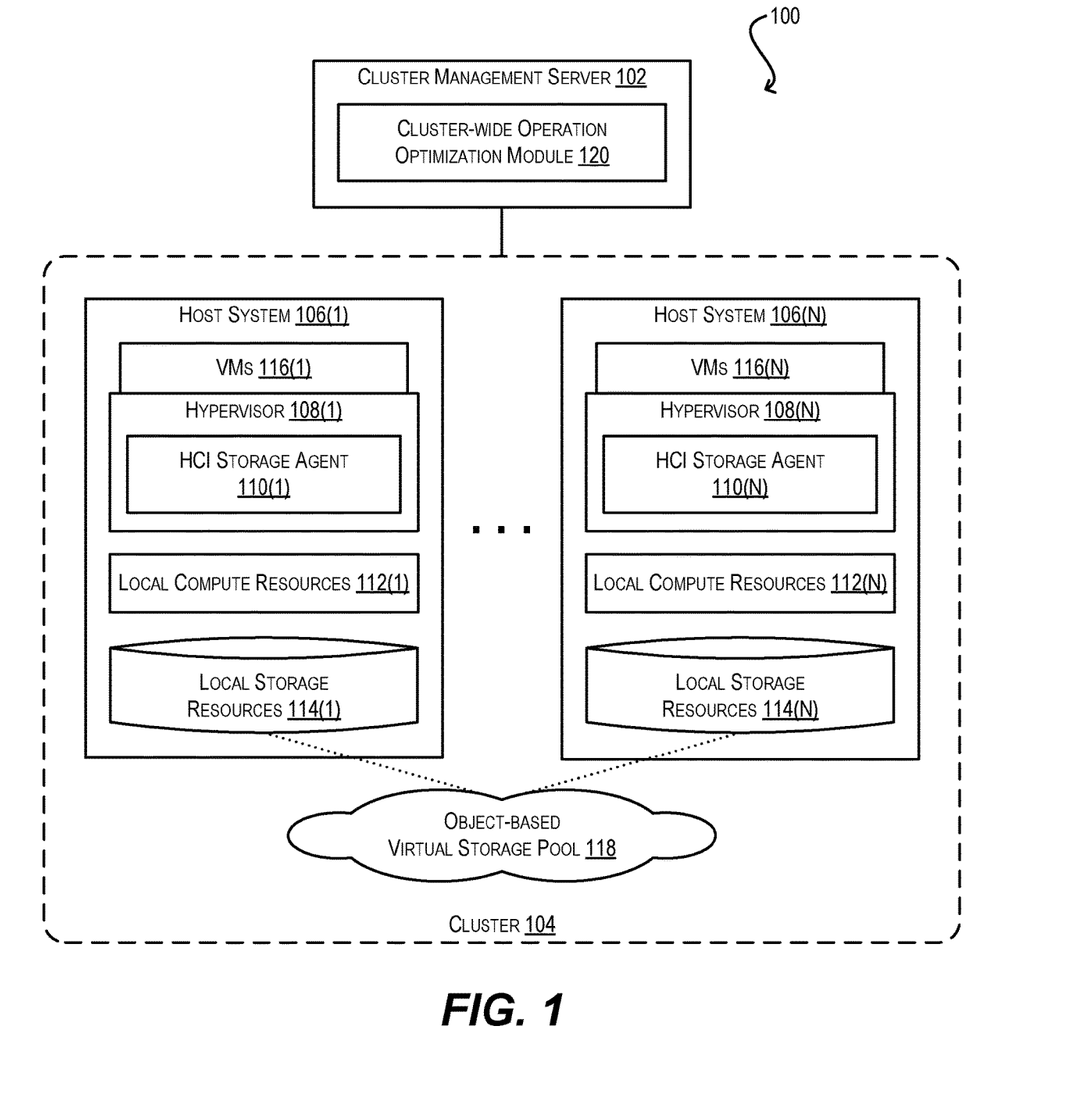
FIG. 1 depicts an example HCI deployment according to certain embodiments.

FIG. 1 depicts an example HCI deployment 100 that implements the techniques of the present disclosure according to certain embodiments. As shown, HCI deployment 100 includes a cluster management server 102 that is communicatively coupled with a cluster 104 comprising a plurality of host systems 106(1)-(N). Each host system 106 includes a hypervisor 108 with an HCI storage agent 110, a set of local compute resources 112 (e.g., central processing units (CPUs)), and a set of local storage resources 114 (e.g., directly-attached solid state disks, magnetic disks, non-volatile memory (NVM), etc.).

Hypervisors 108(1)-(N) are configured to virtualize the local compute resources of host systems 106(1)-(N) and allocate the virtualized compute resources to one or more locally running virtual machines (VMs) 116(1)-(N). Each VM, in turn, is configured to utilize the compute resources provided by its respective hypervisor to execute computing workloads (e.g., guest applications) via a guest operating system (OS) layer.

HCI storage agents 110(1)-(N) residing within hypervisors 108(1)-(N) are configured to aggregate local storage resources 114(1)-(N) of host systems 106(1)-(N) into an object-based virtual storage pool 118 and make virtual storage pool 118 available to VMs 116(1)-(N) for data storage purposes. In this way, the persistent data used by VMs 116(1)-(N) can be maintained directly on host systems 106(1)-(N) rather than on separate, dedicated storage servers/arrays.

Figure 2:
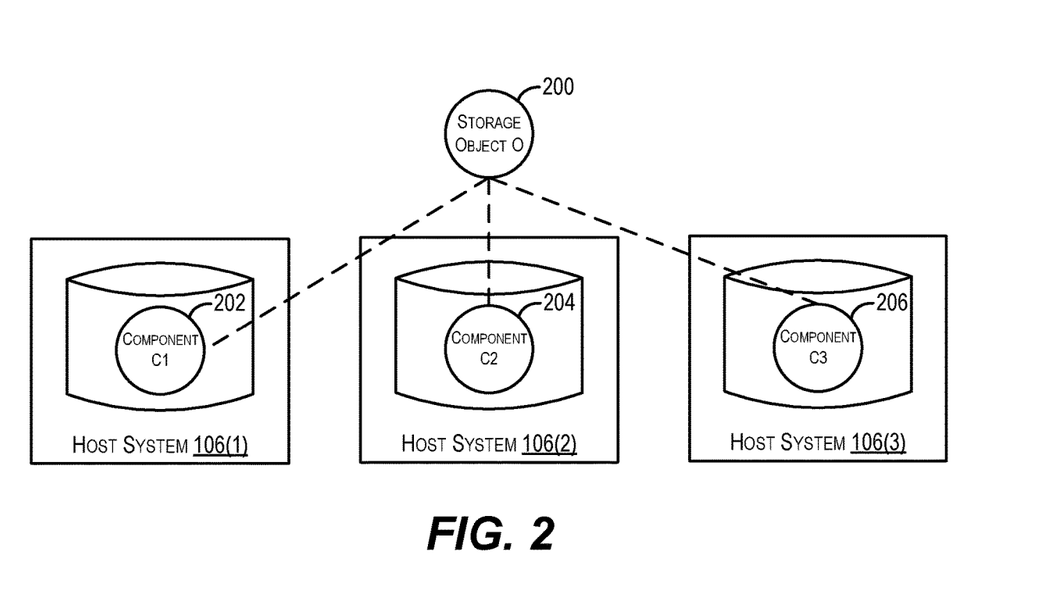
FIG. 2 depicts an example component tree for a storage object according to certain embodiments.

The "object-based" qualifier for virtual storage pool 118 indicates that HCI storage agents 110(1)-(N) manage VM data in pool 118 in the form of storage objects. Each storage object is a logical data volume/container composed of one or more storage components, and each storage component can be understood as a sub-object that contains some portion of the data and/or metadata of the storage object. These storage components are distributed across the local storage resources of host systems 106(1)-(N) which form the physical storage layer of pool 118. For example, FIG. 2 depicts the structure of a simple storage object O (reference numeral 200) according to an embodiment. In this example, storage object O is composed of three storage components C1 (reference numeral 202), C2 (reference numeral 204), and C3 (reference numeral 206) that are maintained on the local storage resources of host systems 106(1), 106(2), and 106(3) respectively.

As mentioned previously, in an HCI deployment like deployment 100 of FIG. 1, administrators occasionally need to perform cluster-wide operations on the deployment's cluster that involve carrying out one or more maintenance tasks on every host system of the cluster (e.g., upgrade/replacement of hardware components, update of software or firmware, etc.). For many types of cluster-wide operations, prior to "actioning" each host system in accordance with the operation (i.e., carrying out the operation's maintenance task(s) on the host system), the VMs and/or storage components residing on that host system are moved, or "evacuated," to other cluster host system(s). This allows the evacuated host system to be taken offline for the maintenance task(s), without impacting the execution of its workloads or the accessibility of its storage.

Unfortunately, existing HCI platforms do not provide a mechanism for intelligently orchestrating the host-by-host evacuation process. Thus, in many cases these existing platforms will move the VMs/storage components of an evacuated host system to one or more other un-actioned host systems, which means that those VMs and storage components will need to be moved again when it is the turn of the other host system(s) to be evacuated and actioned. The end result of this repeated cross-host movement of VMs and storage components is that the time needed to complete the cluster-wide operation is unnecessarily increased. This issue is particularly problematic in clusters that are composed of a large number of host systems, because in such large-scale clusters it is likely that at least some VMs/storage components will be evacuated to several un-actioned host systems in a row (and thus will be moved multiple times).

To address the foregoing and other similar issues, cluster management server 102 of FIG. 1 is enhanced to include a novel cluster-wide operation optimization module 120 (hereinafter referred to as "cluster-wide operation optimizer" 120). At a high level, for each cluster-wide operation that is initiated with respect to cluster 104 of HCI deployment 100, cluster-wide operation optimizer 120 can automatically generate recommendations on how host systems 106(1)-(N) of cluster 104 should be evacuated (e.g., the order of host evacuations and the destination host system(s) for each evacuation) in order to reduce or minimize the total amount of time need to complete the cluster-wide operation.

For example, in one set of embodiments, at the time a host system 106 needs to be selected for actioning via the cluster-wide operation, optimizer 120 can evaluate the amount of local storage consumed by storage components on each un-actioned host system of cluster 104 and compare these values with the available storage capacities of the actioned host systems. Cluster-wide operation optimizer 120 can then generate a recommendation indicating that: (1) the un-actioned host system with the smallest amount of local storage components (i.e., host system $H_{smallest}$) should be actioned next because evacuating the storage components of $H_{smallest}$ will take the least amount of time, and (2) the VMs/storage components of $H_{smallest}$ should be moved to one or more already actioned host systems, rather than to other un-actioned host systems, because this will avoid the need to evacuate those VMs/storage components again during the course of the current cluster-wide operation. If the local storage components of $H_{smallest}$ will not entirely fit within the available storage capacities of the already actioned host system(s), cluster-wide optimizer 120 can recommend that as many of $H_{smallest}$'s storage components as possible are moved to the actioned host system(s) and any remaining storage components are moved to one or more un-actioned host systems with available storage capacity.

In certain embodiments, upon generation of this recommendation, cluster management server 102 can automatically evacuate the VMs and storage components of $H_{smallest}$ in accordance with the recommendation and place $H_{smallest}$ into an offline/maintenance mode, thereby allowing the cluster-wide operation's maintenance task(s) to be performed on the host system. In other embodiments, cluster management server 102 can present the recommendation to a cluster administrator (or some other user/agent) instead of automatically acting upon it. In response, the cluster administrator can manually select which host system 106 to evacuate/action next based on optimizer 120's recommendation and potentially other factors that may be relevant to the current cluster-wide operation (e.g., time constraints, cluster topology, etc.). The foregoing process can then repeat until all of the host systems in cluster 104 have been actioned.

The remaining sections of the present disclosure provide additional details regarding the steps that may be performed by cluster-wide operation optimizer 120 and cluster management server 102 for carrying out cluster-wide operations according to various embodiments. It should be appreciated that HCI deployment 100 shown in FIG. 1 is illustrative and not intended to limit embodiments of the present disclosure. For example, although FIG. 1 depicts a particular placement of cluster-wide operation optimizer 120 within HCI deployment 100, in alternative embodiments some or all of the functionality attributed to this module may be implemented on other entities within or outside deployment 100. Further, the various entities shown in FIG. 1 may include sub-components and/or implement functions that are not specifically described. One of ordinary skill in the art will recognize other variations, modifications, and alternatives.

3. Cluster-Wide Operation Workflow with Automatic Host-by-Host Evacuation

Figure 3:
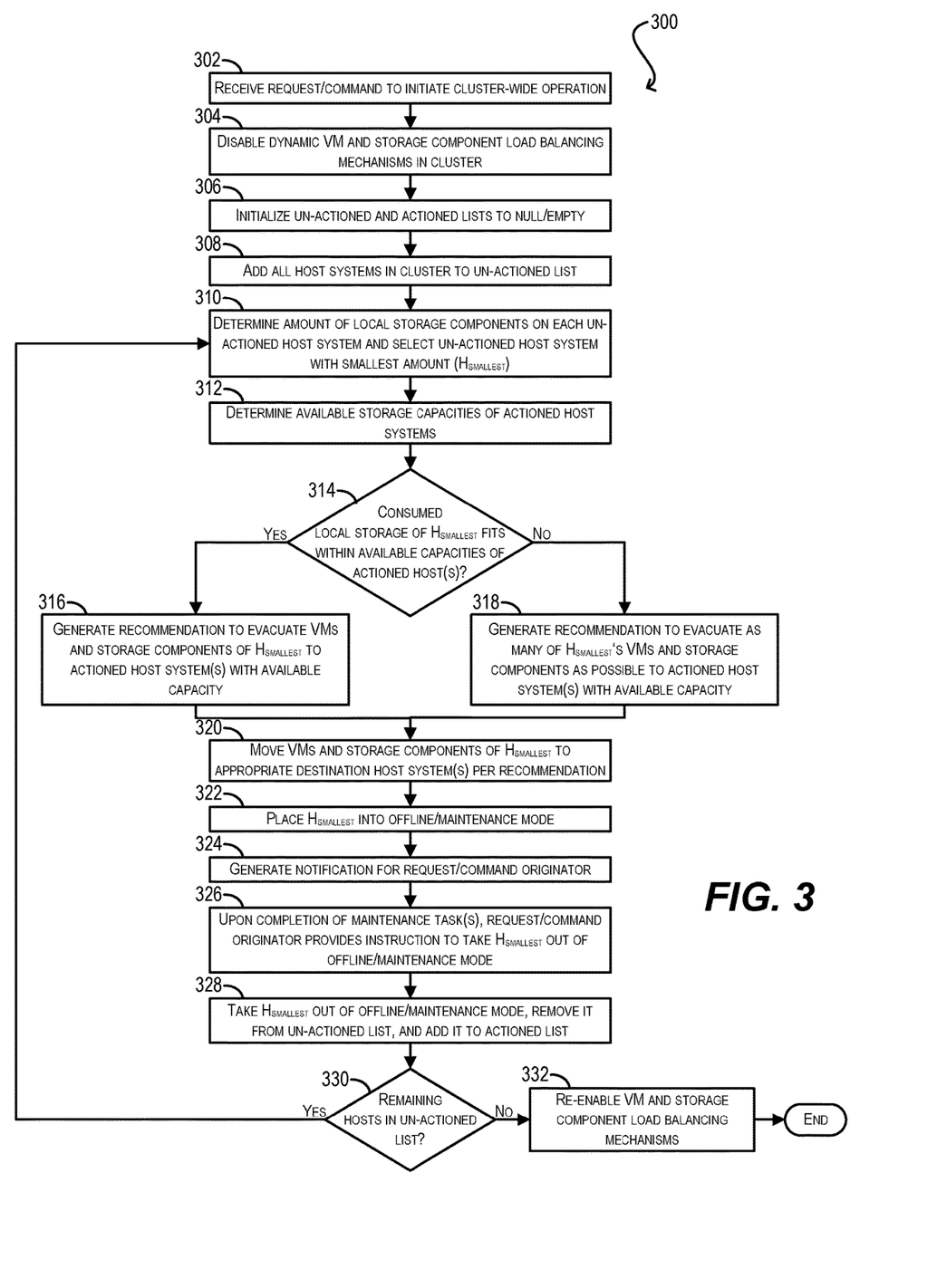
FIG. 3 depicts a first cluster-wide operation workflow according to certain embodiments.

FIG. 3 depicts a workflow 300 that may be performed by cluster-wide operation optimizer 120 and cluster management server 102 of FIG. 1 for carrying out a cluster-wide operation initiated with respect to cluster 104 according to certain embodiments. In workflow 300, cluster management server 102 is configured to automatically evacuate both the VMs and storage components of the cluster's host systems as part of the cluster-wide operation per the recommendations generated by optimizer 120.

Starting with block 302, cluster management server 102 can receive (from, e.g., a cluster administrator) a request/command to initiate a cluster-wide operation on cluster 104 of HCI deployment 100. As mentioned previously, this cluster-wide operation can involve performing one or more maintenance tasks on each host system 106 of the cluster, such as upgrading/replacing host hardware, updating host software, etc.

In response to the request/command, cluster-wide optimizer 120 can temporarily disable any mechanisms that may be currently active in cluster 104 for dynamically load balancing VMs or storage components across host systems 106(1)-(N) (block 304). An example of the former is VMware's Distributed Resource Scheduler (DRS) and an example of the latter is VMware's vSAN Load Balancer. By temporarily disabling these mechanisms, optimizer 120 can ensure that they will not interfere with the host-by-host evacuation of VMs and storage components that will be performed as part of the cluster-wide operation.

At block 306, cluster-wide operation optimizer 120 can initialize two lists—an "actioned list" configured to track host systems in cluster 104 that have been actioned per the cluster-wide operation and an "un-actioned list" configured to track host systems in cluster 104 that have not yet been actioned per the cluster-wide operation—to null/empty. In addition, at block 308, cluster-wide operation optimizer 120 can add all host systems 106(1)-(N) in cluster 104 to the un-actioned list (because none of these host systems have yet been actioned).

Then, at blocks 310-314, cluster-wide operation optimizer 120 can (1) determine the amount of local storage consumed by storage components on each host system in the un-actioned list and select the un-actioned host system with the smallest amount of consumed local storage (i.e., host system $H_{smallest}$); (2) determine the available storage capacities of the host systems in the actioned list; and (3) check whether the consumed local storage of un-actioned host system $H_{smallest}$ fits with the available storage capacity (or capacities) of the actioned host system(s).

If the answer at block 314 is yes, cluster-wide operation optimizer 120 can generate a recommendation to evacuate the VMs and storage components of $H_{smallest}$ to the actioned host system(s) with sufficient available storage capacity and can communicate this recommendation to cluster management server 102 (block 316). Alternatively, if the answer at block 314 is no, cluster-wide operation optimizer 120 can generate a recommendation to evacuate as many of $H_{smallest}$'s VMs and storage components as possible to the actioned host system(s) (with the remainder going to one or more un-actioned host systems) and communicate this recommendation to cluster management server 102 (block 318).

In response to receiving the recommendation from cluster-wide operation optimizer 120 per either block 316 or 318, cluster management server 102 can move the VMs and storage components of $H_{smallest}$ to the appropriate destination host system(s) per the recommendation (block 320), place $H_{smallest}$ into an offline/maintenance mode (block 322), and generate a notification for the originator of the request/command received at block 302 (e.g., a cluster administrator) that $H_{smallest}$ has been placed into offline/maintenance mode (block 324). This notification informs the request/command originator that the operation's maintenance task(s) can now be performed on that host system.

Upon receiving the notification, the request/command originator can carry out the maintenance task(s) on $H_{smallest}$ and, once those task(s) are completed, can instruct cluster management server 102 to take $H_{smallest}$ out of offline/maintenance mode (block 326). Cluster-wide optimizer 120 can then take $H_{smallest}$ out of offline/maintenance mode, remove $H_{smallest}$ from the un-actioned list, add $H_{smallest}$ to the actioned list, and check whether there are any remaining host systems in the un-actioned list (blocks 328 and 330).

If the answer at block 330 is no, that means all host systems 106(1)-(N) in cluster 104 have been evacuated/actioned and the cluster-wide operation is now complete. Thus, cluster-wide operation optimizer 120 can re-enable the VM and storage component load balancing mechanisms previously disabled at block 304 (block 332) and workflow 300 can end.

On the other hand, if the answer at block 330 is yes, that means there are still one or more host systems in cluster 104 that have not yet been evacuated and actioned per the cluster-wide operation. In this case, cluster-wide operation optimizer 120 can return to block 310 and repeat the foregoing steps until all of the host systems have been evacuated/actioned.

Figure 4A:
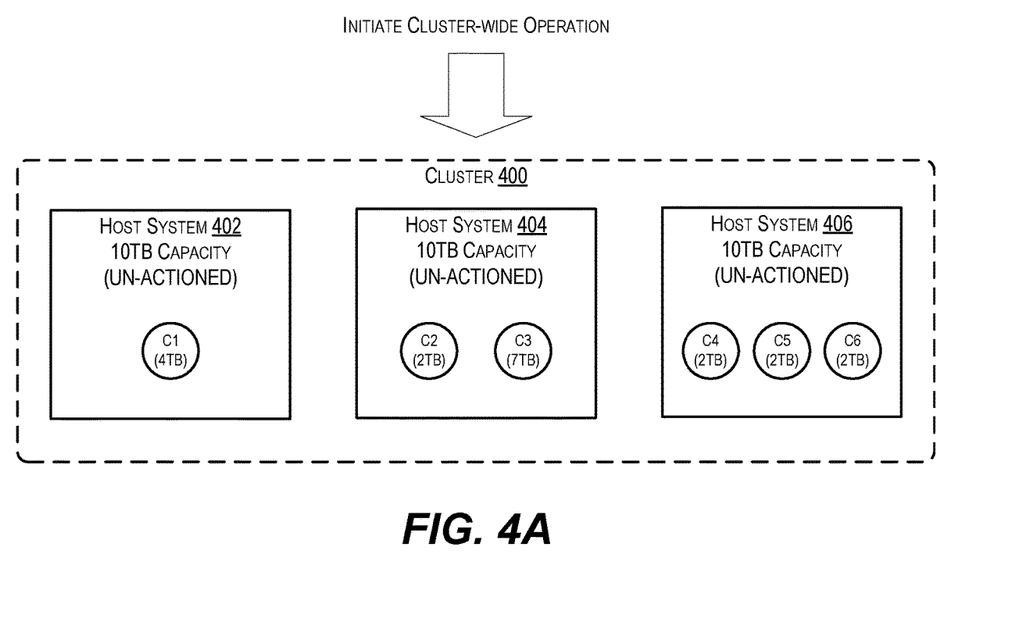
FIGS. 4A, 4B, 4C, and 4D depict an example scenario per the workflow of FIG. 3 according to certain embodiments.

To further clarify the processing presented in workflow 300, FIGS. 4A, 4B, 4C, and 4D depict an example scenario in which workflow 300 is applied to a cluster 400 comprising three host systems 402, 404, and 406. As shown in FIG. 4A, host system 402 initially includes one storage component C1 (4 terabytes (TB) in size), host system 404 initially includes two storage components C2 (2 TB in size) and C3 (7 TB in size), and host system 406 initially includes three storage components C4 (2 TB in size), C5 (2 TB size), and C6 (2 TB in size). It is assumed that each host system 402/404/406 has 10 TB in local storage capacity (and therefore has enough storage capacity to hold C1, C2+C3, or C4+C5+C6). In addition, it is assumed that a cluster-wide operation is initiated on cluster 400 while host systems 402, 404, and 406 are in the state shown in FIG. 4A. For simplicity, only the storage components of host systems 402, 404, and 406 are depicted here (any VMs running on these host systems can be moved/evacuated in the same manner as the storage components).

Figure 4B:
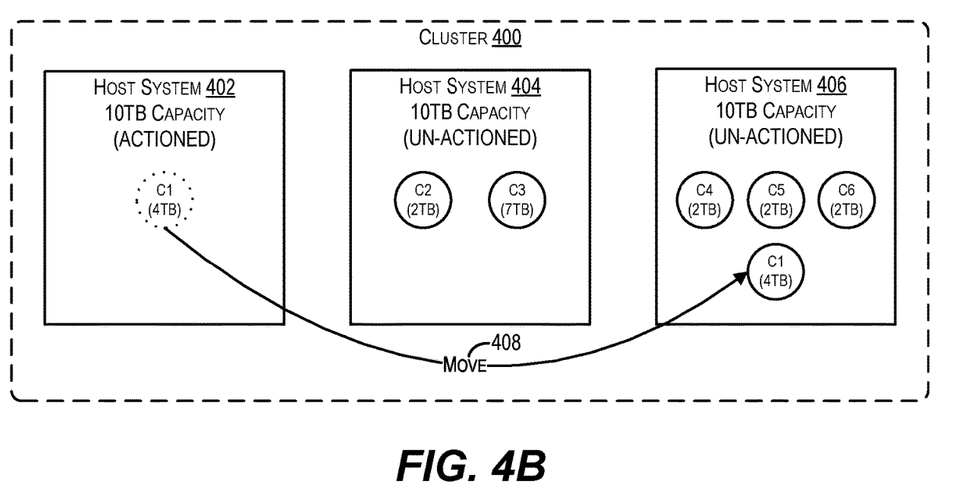

FIG. 4B illustrates that, upon the initiation of the cluster-wide operation, host system 402 is the first host system to be evacuated/actioned per workflow 300 because host system 402 is the un-actioned host with the smallest amount of local storage consumed by storage components (4 TB). Thus, storage component C1 of host system 402 is moved to a host system that has sufficient free storage capacity to hold C1 (in this example, host system 406), which is shown via arrow 408. Note that for this initial evacuation, there are no actioned host systems and thus storage component C1 cannot be moved to an actioned host. Once storage component C1 is moved and the cluster-wide operation's maintenance task(s) are performed on host system 402, host system 402 becomes an actioned host.

Figure 4C:
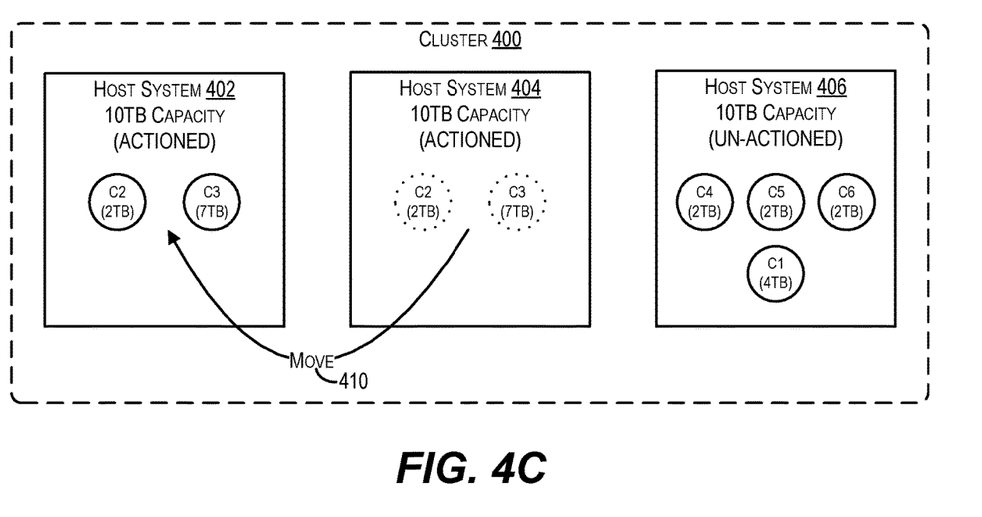

FIG. 4C illustrates that host system 404 is the next host system to be evacuated/actioned per workflow 300 because, of the remaining un-actioned hosts, host system 404 has the smallest amount of local storage consumed by storage components (9 TB). Thus, storage components C2 and C3 of host system 404 are moved to an actioned host system that has sufficient free storage capacity to hold C2 and C3 (in this example, host system 402), which is shown via arrow 410. Once storage components C2 and C3 are moved and the cluster-wide operation's maintenance task(s) are performed on host system 404, host system 404 becomes an actioned host.

Figure 4D:
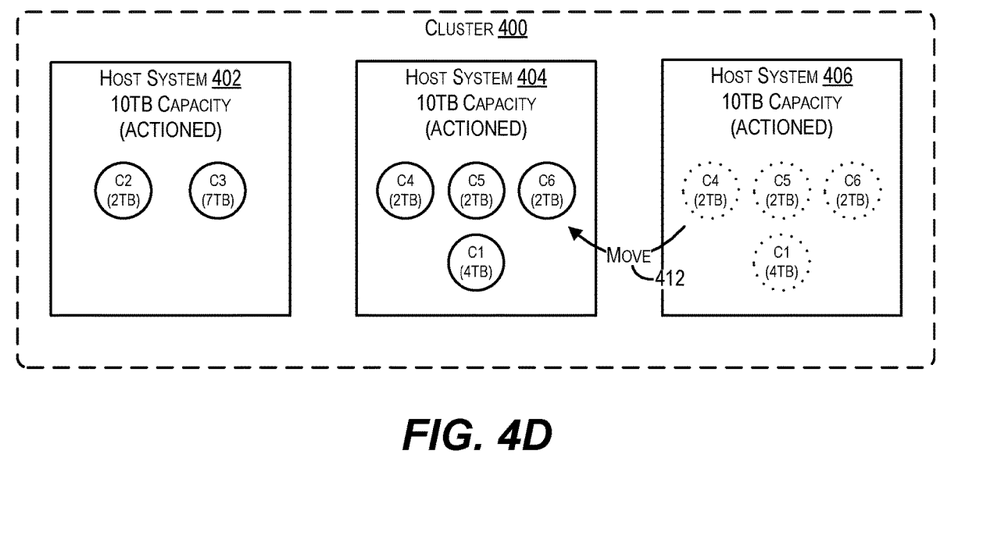

Finally, FIG. 4D illustrates that host system 406 is the next host system to be evacuated/actioned per workflow 300 because host system 406 is the only remaining un-actioned host. Thus, storage components C4, C5, C6, and C1 of host system 406 are moved to an actioned host system that has sufficient free storage capacity to hold these components (in this example, host system 404), which is shown via arrow 412. Once storage components C4, C5, C6, and C1 are moved and the cluster-wide operation's maintenance task(s) are performed on host system 406, host system 406 becomes an actioned host and the cluster-wide operation is deemed complete.

Figure 5A:
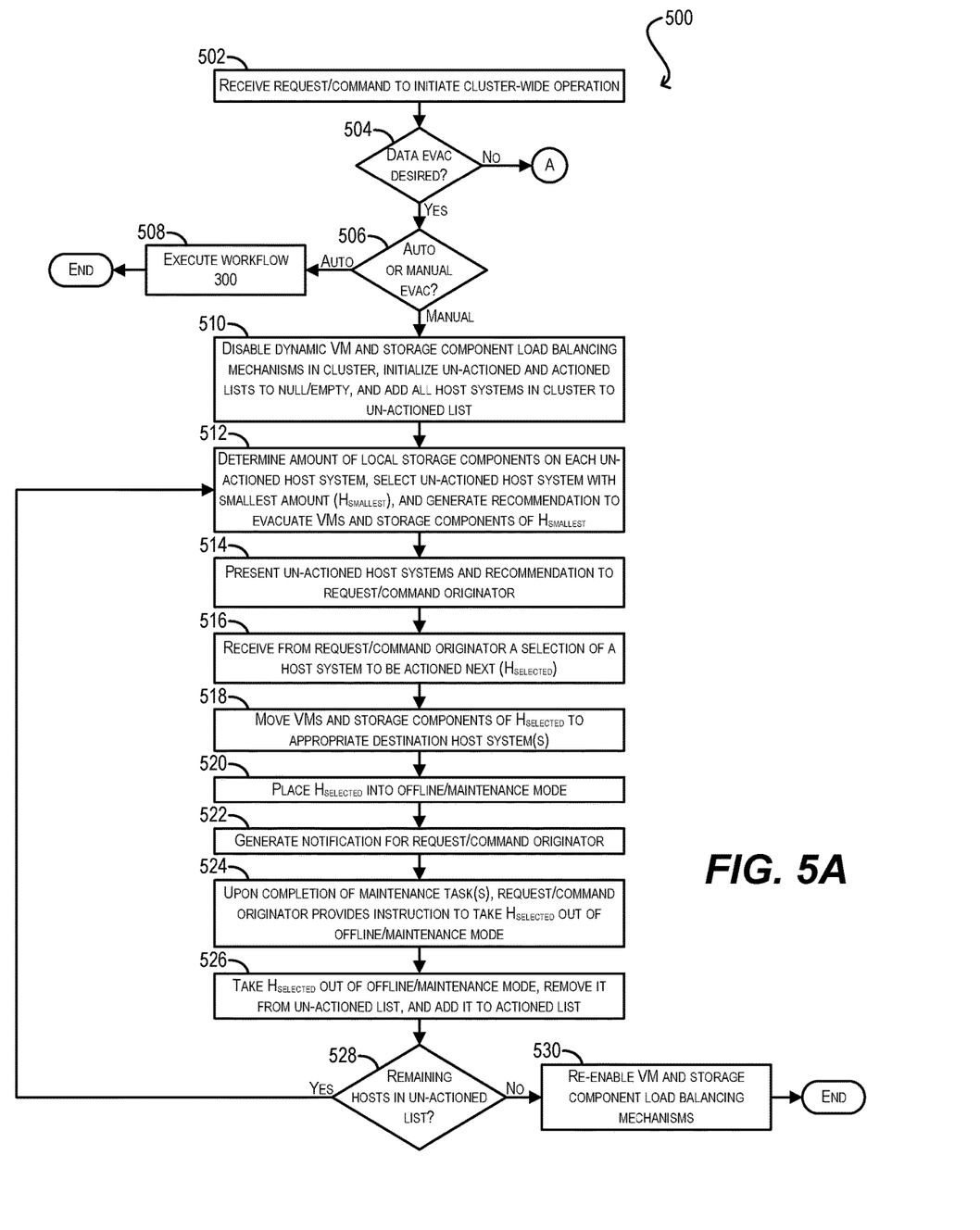
FIGS. 5A and 5B depict a second cluster-wide operation workflow according to certain embodiments.
Figure 5B:
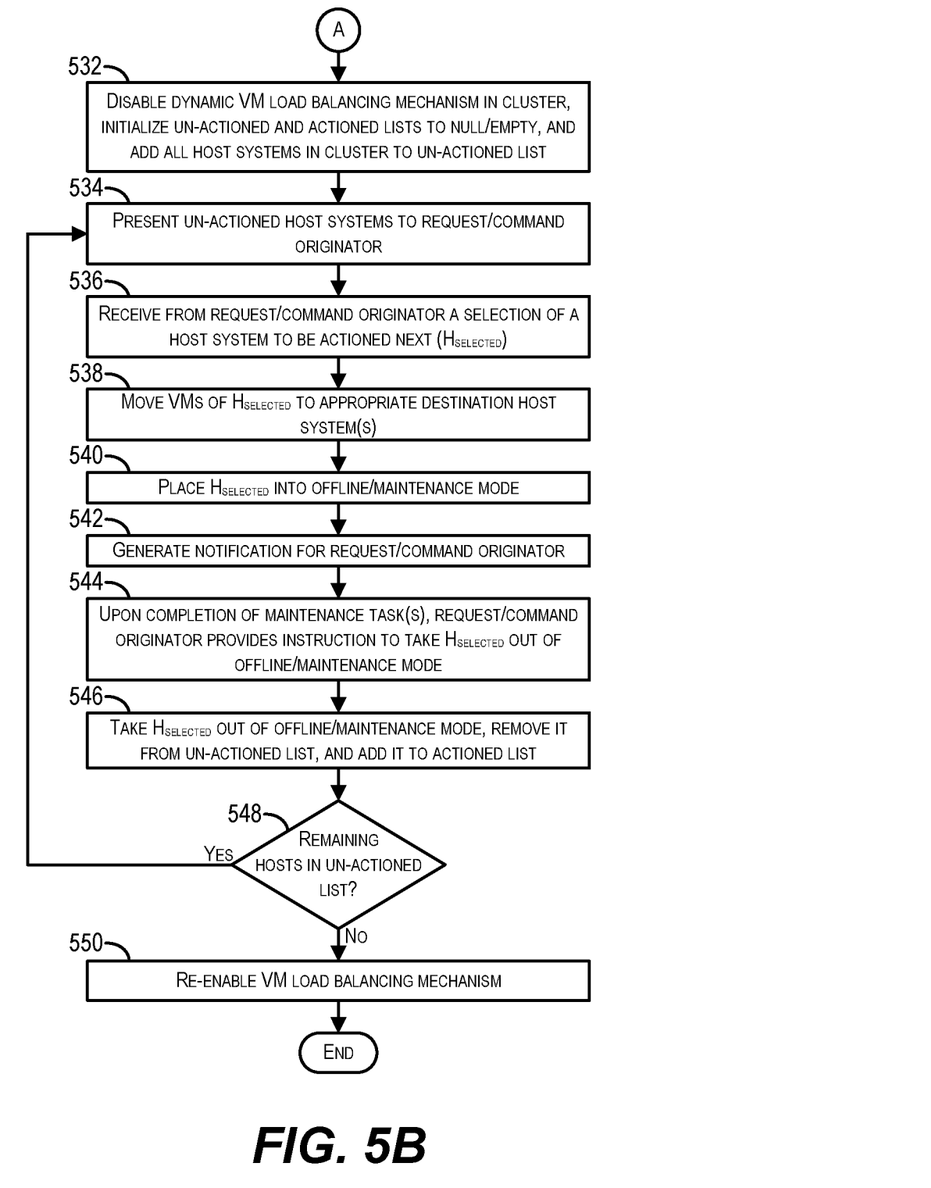

4. Cluster-Wide Operation Workflow with Manual or Automatic Host-by-Host Evacuation FIGS. 5A and 5B depict an alternative workflow 500 that may be performed by cluster-wide operation optimizer 120 and cluster management server 102 of FIG. 1 for carrying out a cluster-wide operation initiated with respect to cluster 104 according to certain embodiments. In workflow 500, the cluster administrator may choose to either (1) manually select the order in which host systems will be evacuated as part of the cluster-wide operation or (2) have cluster management server 102 automatically evacuate the host systems in accordance with the recommendations generated by optimizer 120. In addition, the cluster administrator may choose to either (1) evacuate both the VMs and storage components from each host system or (2) evacuate only the VMs and leave the storage components in place. The latter choice of evacuating only the VMs may be appropriate in circumstances where the cluster-wide operation will be relatively short-lived and thus it would not be worth the time and bandwidth to evacuate the storage components from each host system (which may correspond to many terabytes of data per host).

Starting with blocks 502 and 504 of FIG. 5A, cluster management server 102 can receive (from, e.g., a cluster administrator) a request/command to initiate a cluster-wide operation on cluster 104 of HCI deployment 100 and cluster-wide operation optimizer 120 can determine whether the request/command indicates that data (i.e., storage component) evacuation is desired.

If the answer at block 504 is yes, cluster-wide operation optimizer 120 can further determine whether the request/command indicates that the host-by-host evacuation process for the cluster-wide operation should proceed in an automatic or manual fashion (block 506). If the answer at block 506 is "automatic," cluster-wide optimizer 120 and cluster management server 120 can proceed to execute workflow 300 of FIG. 3 (block 508) and once that is completed, workflow 500 can end.

On the other hand, if the answer at block 506 is "manual," cluster-wide optimizer 120 can temporarily disable any mechanisms that may be currently active in cluster 104 for dynamically load balancing VMs or storage components across host systems 106(1)-(N), initialize the actioned and un-actioned lists to null/empty, and add all host systems 106(1)-(N) in cluster 104 to the un-actioned list (block 510).

At block 512, cluster-wide operation optimizer 120 can determine the amount of local storage consumed by storage components on each host system in the un-actioned list, select the un-actioned host system with the smallest amount of consumed local storage (i.e., host system $H_{smallest}$), and generate a recommendation to evacuate the VMs and storage components of $H_{smallest}$. This recommendation, along with the un-actioned list, can be communicated to cluster management server 102.

In response, cluster management server 102 can present all of the host systems in un-actioned list to the originator of the request/command received at block 502 (e.g., the cluster administrator), along with the recommendation generated by cluster-wide operation optimizer 120 (block 514), and can receive from the request/command originator a manual selection of a particular un-actioned host system (i.e., host system $H_{selected}$) (block 516). In various embodiments, $H_{selected}$ may be the same host system as, or different from, $H_{smallest}$.

Upon receiving $H_{selected}$, cluster management server 102 can move the VMs and storage components of $H_{selected}$ to one or more appropriate destination host system(s) (e.g., actioned host system(s) that have available storage capacity) (block 518), place $H_{selected}$ into an offline/maintenance mode (block 520), and generate a notification for the request/command originator that $H_{selected}$ has been placed into offline/maintenance mode (block 522). This notification informs the request/command originator that the operation's maintenance task(s) can now be performed on that host system.

Upon receiving the notification, the request/command originator can carry out the maintenance task(s) on $H_{selected}$ and, once those task(s) are completed, can instruct cluster management server 102 to take $H_{selected}$ out of offline/maintenance mode (block 524). Cluster-wide optimizer 120 can then take $H_{selected}$ out of offline/maintenance mode, remove $H_{selected}$ from the un-actioned list, add $H_{selected}$ to the actioned list, and check whether there are any remaining host systems in the un-actioned list (blocks 526 and 528).

If the answer at block 528 is no, that means all host systems 106(1)-(N) in cluster 104 have been evacuated/actioned and the cluster-wide operation is now complete. Thus, cluster-wide operation optimizer 120 can re-enable the VM and storage component load balancing mechanisms previously disabled at block 510 (block 530) and workflow 500 can end.

On the other hand, if the answer at block 528 is yes, that means there are still one or more host systems in cluster 104 that have not yet been evacuated and actioned per the cluster-wide operation. In this case, cluster-wide operation optimizer 120 can return to block 512 and repeat the foregoing steps until all of the host systems have been evacuated/actioned.

Returning now to block 504, if the answer at this block is no (i.e., storage component evacuation is not desired), workflow 500 can proceed to FIG. 5B. At block 532 of FIG. 5B, cluster-wide operation optimizer 120 can temporarily disable any dynamic VM load balancing mechanism currently enabled in cluster 104 (while keeping any dynamic storage component load balancing mechanism(s) enabled), initialize the un-actioned and actioned lists to null/empty, add all host systems 106(1)-(N) to the un-actioned list, and communicate the un-actioned list to cluster management server 102.

In response, cluster management server 102 can present the host systems in the un-actioned list to the request/command originator (block 534), and can receive from the request/command originator a manual selection of a particular un-actioned host system (i.e., host system $H_{selected}$) (block 536). Cluster management server 102 can thereafter move the VM of $H_{selected}$ to an appropriate destination host system (e.g., an actioned host) (block 538), place $H_{selected}$ into an offline/maintenance mode (block 540), and generate a notification for the request/command originator that $H_{selected}$ has been placed into offline/maintenance mode (block 542).

Upon receiving the notification, the request/command originator can carry out the maintenance task(s) on $H_{selected}$ and, once those task(s) are completed, can instruct cluster management server 102 to take $H_{selected}$ out of offline/maintenance mode (block 544). Cluster-wide optimizer 120 can then take $H_{selected}$ out of offline/maintenance mode, remove $H_{selected}$ from the un-actioned list, add $H_{selected}$ to the actioned list, and check whether there are any remaining host systems in the un-actioned list (blocks 546 and 548).

If the answer at block 548 is no, that means all host systems 106(1)-(N) in cluster 104 have been evacuated/actioned and the cluster-wide operation is now complete. Thus, cluster-wide operation optimizer 120 can re-enable the VM load balancing mechanism previously disabled at block 532 (block 550) and workflow 500 can end.

On the other hand, if the answer at block 548 is yes, that means there are still one or more host systems in cluster 104 that have not yet been evacuated and actioned per the cluster-wide operation. In this case, cluster-wide operation optimizer 120 can return to block 534 and repeat the foregoing steps until all of the host systems have been evacuated/actioned.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general-purpose computer system selectively activated or configured by program code stored in the computer system. In particular, various general-purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid-state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for optimizing cluster-wide operations in a hyper-converged infrastructure (HCI) deployment, the method comprising:
   receiving, by a computer system, a request to initiate a cluster-wide operation on a cluster of the HCI deployment, wherein the cluster includes a plurality of host systems, and wherein the cluster-wide operation involves a host-by-host evacuation wherein the host-by-host evacuation comprises, for each host system in the plurality of host systems, designating one host system as a source host system and the other host systems as destination host systems and moving virtual machines (VMs) and storage components from the source host system in the plurality of host systems to the destination hosts in the plurality of host systems such that the source host system may be taken offline and actioned;
   providing, to an originator of the request:
   an option to disable the host-by-host evacuation of the storage components from the plurality of host systems as part of the cluster-wide operation; and
   an option to manually specify an order in which the plurality of host systems are evacuated; and
   generating, by the computer system, a set of recommendations for executing the host-by-host evacuation in a manner that minimizes a total amount of time needed to complete the cluster-wide operation; and executing, by the computer system, the host-by-host evacuation in accordance with the set of recommendations.

2. The method of claim 1 wherein the set of recommendations include an order in which to evacuate the plurality of host systems and, for each host system, one or more destination host systems in the cluster to which the VMs and the storage components of the host system should be moved.

3. The method of claim 1 wherein the set of recommendations include recommendations for evacuating host systems with lesser amounts of local storage capacity consumed by storage components before evacuating host systems with greater amounts of local storage capacity consumed by storage components.

4. The method of claim 1 wherein the set of recommendations include, for each host system, a recommendation for moving the VMs and the storage components of the host system to one or more other host systems in the cluster that have already been actioned in accordance with the cluster-wide operation.

5. The method of claim 4 wherein, if the VMs and the storage components of the host system cannot by entirely moved to other host systems that have already been actioned, the recommendation further specifies that a portion of the VMs and the storage components may be moved to one or more other host systems that have not yet been actioned in accordance with the cluster-wide operation.

6. The method of claim 1 further comprising, prior to executing the host-by-host evacuation:

disabling any VM or storage component load balancing mechanisms that are currently enabled for the cluster.

7. A non-transitory computer readable storage medium having stored thereon program code executable by a computer system, the program code embodying a method for optimizing cluster-wide operations in a hyper-converged infrastructure (HCI) deployment, the method comprising:

receiving, by a computer system, a request to initiate a cluster-wide operation on a cluster of the HCI deployment, wherein the cluster includes a plurality of host systems, and wherein the cluster-wide operation involves a host-by-host evacuation wherein the host-by-host evacuation comprises, for each host system in the plurality of host systems, designating one host system as a source host system and the other host systems as destination host systems and moving virtual machines (VMs) and storage components from the source host system in the plurality of host systems to the destination hosts in the plurality of host systems such that the source host system may be taken offline and actioned;

providing, to an originator of the request:

an option to disable the host-by-host evacuation of the storage components from the plurality of host systems as part of the cluster-wide operation; and an option to manually specify an order in which the plurality of host systems are evacuated; and generating a set of recommendations for executing the host-by-host evacuation in a manner that minimizes a total amount of time needed to complete the cluster-wide operation; and executing the host-by-host evacuation in accordance with the set of recommendations.

8. The non-transitory computer readable storage medium of claim 7 wherein the set of recommendations include an order in which to evacuate the plurality of host systems and, for each host system, one or more destination host systems in the cluster to which the VMs and the storage components of the host system should be moved.

9. The non-transitory computer readable storage medium of claim 7 wherein the set of recommendations include recommendations for evacuating host systems with lesser amounts of local storage capacity consumed by storage components before evacuating host systems with greater amounts of local storage capacity consumed by storage components.

10. The non-transitory computer readable storage medium of claim 7 wherein the set of recommendations include, for each host system, a recommendation for moving the VMs and the storage components of the host system to one or more other host systems in the cluster that have already been actioned in accordance with the cluster-wide operation.

11. The non-transitory computer readable storage medium of claim 10 wherein, if the VMs and the storage components of the host system cannot by entirely moved to other host systems that have already been actioned, the recommendation further specifies that a portion of the VMs and the storage components may be moved to one or more other host systems that have not yet been actioned in accordance with the cluster-wide operation.

12. The non-transitory computer readable storage medium of claim 7 wherein the method further comprises, prior to executing the host-by-host evacuation:

disabling any VM or storage component load balancing mechanisms that are currently enabled for the cluster.

13. A computer system comprising:

a processor; and a non-transitory computer readable medium having stored thereon program code that, when executed, causes the processor to:

receive, by a computer system, a request to initiate a cluster-wide operation on a cluster of the HCI deployment, wherein the cluster includes a plurality of host systems, and wherein the cluster-wide operation involves a host-by-host evacuation wherein the host-by-host evacuation comprises, for each host system in the plurality of host systems, designating one host system as a source host system and the other host systems as destination host systems and moving virtual machines (VMs) and storage components from the source host system in the plurality of host systems to the destination hosts in the plurality of host systems such that the source host system may be taken offline and actioned;

provide, to an originator of the request:

an option to disable the host-by-host evacuation of the storage components from the plurality of host systems as part of the cluster-wide operation; and an option to manually specify an order in which the plurality of host systems are evacuated; and generate a set of recommendations for executing the host-by-host evacuation in a manner that minimizes a total amount of time needed to complete the cluster-wide operation; and execute the host-by-host evacuation in accordance with the set of recommendations.

14. The computer system of claim 13 wherein the set of recommendations include an order in which to evacuate the plurality of host systems and, for each host system, one or more destination host systems in the cluster to which the VMs and the storage components of the host system should be moved.

15. The computer system of claim 13 wherein the set of recommendations include recommendations for evacuating host systems with lesser amounts of local storage capacity consumed by storage components before evacuating host systems with greater amounts of local storage capacity consumed by storage components.

16. The computer system of claim 13 wherein the set of recommendations include, for each host system, a recommendation for moving the VMs and the storage components of the host system to one or more other host systems in the cluster that have already been actioned in accordance with the cluster-wide operation.

17. The computer system of claim 16 wherein, if the VMs and the storage components of the host system cannot by entirely moved to other host systems that have already been actioned, the recommendation further specifies that a portion of the VMs and the storage components may be moved to one or more other host systems that have not yet been actioned in accordance with the cluster-wide operation.

18. The computer system of claim 13 wherein the program code further causes the processor to, prior to executing the host-by-host evacuation:

disable any VM or storage component load balancing mechanisms that are currently enabled for the cluster.

* * * * *